United States Patent
Cho et al.

(10) Patent No.: US 12,065,514 B2
(45) Date of Patent: Aug. 20, 2024

(54) POLYETHYLENE HAVING HIGH PRESSURE RESISTANCE AND CROSSLINKED POLYETHYLENE PIPE COMPRISING THE SAME

(71) Applicant: LG Chem, Ltd., Seoul (KR)

(72) Inventors: Sol Cho, Daejeon (KR); Hyunsup Lee, Daejeon (KR); Sun Mi Kim, Daejeon (KR); Yi Young Choi, Daejeon (KR); Myunghan Lee, Daejeon (KR); Yeonsoo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 491 days.

(21) Appl. No.: 17/414,616

(22) PCT Filed: Feb. 20, 2020

(86) PCT No.: PCT/KR2020/002467
§ 371 (c)(1),
(2) Date: Jun. 16, 2021

(87) PCT Pub. No.: WO2020/171623
PCT Pub. Date: Aug. 27, 2020

(65) Prior Publication Data
US 2022/0135712 A1    May 5, 2022

(30) Foreign Application Priority Data

Feb. 20, 2019 (KR) .................. 10-2019-0020026
Feb. 19, 2020 (KR) .................. 10-2020-0020643

(51) Int. Cl.
| | |
|---|---|
| C08F 110/02 | (2006.01) |
| C08F 4/659 | (2006.01) |
| C08F 4/6592 | (2006.01) |
| C08J 3/24 | (2006.01) |
| C08K 5/14 | (2006.01) |
| C08L 23/06 | (2006.01) |
| F16L 11/04 | (2006.01) |

(52) U.S. Cl.
CPC ........ *C08F 110/02* (2013.01); *C08F 4/65916* (2013.01); *C08F 4/65927* (2013.01); *C08J 3/24* (2013.01); *C08K 5/14* (2013.01); *C08L 23/06* (2013.01); *F16L 11/04* (2013.01); *C08L 2203/18* (2013.01); *C08L 2207/062* (2013.01); *C08L 2312/00* (2013.01); *C08L 2314/06* (2013.01)

(58) Field of Classification Search
None
See application file for complete search history.

(56) References Cited

U.S. PATENT DOCUMENTS

| | | | |
|---|---|---|---|
| 6,124,406 A | 9/2000 | Cinadr et al. | |
| 8,815,357 B1 | 8/2014 | Inn et al. | |
| 9,540,457 B1 | 1/2017 | Ding et al. | |
| 11,905,345 B2* | 2/2024 | Lee ................ | C08F 110/02 526/126 |
| 2003/0055176 A1 | 3/2003 | Jacobsen et al. | |
| 2003/0195306 A1 | 10/2003 | Tsuie et al. | |
| 2008/0182473 A1 | 7/2008 | Chen et al. | |
| 2008/0226858 A1 | 9/2008 | Walter et al. | |
| 2008/0269366 A1 | 10/2008 | Shaffer et al. | |
| 2011/0262671 A1 | 10/2011 | Pakkanen et al. | |
| 2011/0268902 A1 | 11/2011 | Pakkanen et al. | |
| 2011/0318516 A1 | 12/2011 | Pakkanen et al. | |
| 2012/0128912 A1 | 5/2012 | Ek et al. | |
| 2014/0113133 A1 | 4/2014 | Sun et al. | |
| 2014/0342141 A1 | 11/2014 | Cui et al. | |
| 2015/0155408 A1 | 6/2015 | Taniguchi et al. | |
| 2015/0291774 A1 | 10/2015 | Chen et al. | |
| 2016/0001482 A1 | 1/2016 | Naito et al. | |
| 2016/0251535 A1 | 9/2016 | Chaudhary | |
| 2016/0280822 A1 | 9/2016 | Kim et al. | |
| 2017/0029538 A1 | 2/2017 | Song et al. | |
| 2017/0233511 A1 | 8/2017 | Sun et al. | |
| 2017/0369612 A1 | 12/2017 | Dreng et al. | |
| 2018/0223009 A1 | 8/2018 | Kim et al. | |
| 2019/0119420 A1 | 4/2019 | Park et al. | |
| 2020/0123357 A1* | 4/2020 | Kim .................. | C08F 4/65927 |
| 2021/0163640 A1 | 6/2021 | Lee et al. | |
| 2021/0230323 A1* | 7/2021 | Lee ................... | C08F 110/02 |
| 2022/0010110 A1 | 1/2022 | Cho et al. | |
| 2022/0098393 A1* | 3/2022 | Lee ................... | C08F 4/65904 |

(Continued)

FOREIGN PATENT DOCUMENTS

| | | |
|---|---|---|
| CN | 1359396 A | 7/2002 |
| CN | 1934384 A | 3/2007 |
| CN | 102333795 A | 1/2012 |

(Continued)

OTHER PUBLICATIONS

International Search Report for PCT/KR2020/002468 mailed Jun. 12, 2020; 2 pages.
International Search Report for Application No. PCT/KR2020/002469, dated Jun. 4, 2020, 3 pages.
Extended Search Report for Application No. 20759132.2 dated Feb. 1, 2022. 7 pgs.
Extended Search Report for Application No. 20758494.7 dated Feb. 7, 2022. 7 pgs.

(Continued)

*Primary Examiner* — Richard A Huhn
(74) *Attorney, Agent, or Firm* — Lerner David LLP

(57) ABSTRACT

The present disclosure relates to a polyethylene having high pressure resistance and a crosslinked polyethylene pipe including the same. The polyethylene according to the present disclosure has high melt index and density and exhibits a sufficient degree of crosslinking, thereby exhibiting excellent strength and pressure resistance characteristics.

13 Claims, No Drawings

(56) References Cited

U.S. PATENT DOCUMENTS

2022/0135712 A1    5/2022    Cho et al.

FOREIGN PATENT DOCUMENTS

| | | |
|---|---|---|
| CN | 103183859 A | 7/2013 |
| CN | 104321886 A | 1/2015 |
| CN | 104334630 A | 2/2015 |
| CN | 105814101 A | 7/2016 |
| CN | 106232635 A | 12/2016 |
| CN | 106661160 A | 5/2017 |
| CN | 106687487 A | 5/2017 |
| CN | 108401432 A | 8/2018 |
| CN | 112088174 A | 12/2020 |
| CN | 112088175 A | 12/2020 |
| EP | 1574772 A1 | 9/2005 |
| EP | 3476870 A1 | 5/2019 |
| EP | 3770187 A1 | 1/2021 |
| EP | 3778664 A1 | 2/2021 |
| EP | 3778665 A1 | 2/2021 |
| JP | 2007017744 A | 1/2007 |
| JP | 2014101481 A | 6/2014 |
| JP | 2015224996 A | 12/2015 |
| KR | 20000011110 A | 2/2000 |
| KR | 20070004030 A | 1/2007 |
| KR | 20080093723 A | 10/2008 |
| KR | 20090101493 A | 9/2009 |
| KR | 20100017382 A | 2/2010 |
| KR | 20110091709 A | 8/2011 |
| KR | 20120023107 A | 3/2012 |
| KR | 101447778 B1 | 10/2014 |
| KR | 20150021926 A | 3/2015 |
| KR | 20150058938 A | 5/2015 |
| KR | 20150132535 A | 11/2015 |
| KR | 20160016784 A | 2/2016 |
| KR | 20160029704 A | 3/2016 |
| KR | 20160090827 A | 8/2016 |
| KR | 20160121940 A | 10/2016 |
| KR | 20180046291 A | 5/2018 |
| KR | 20180064115 A | 6/2018 |
| KR | 20180067944 A | 6/2018 |
| KR | 20180072470 A | 6/2018 |
| KR | 20180083247 A | 7/2018 |
| KR | 20180103349 A | 9/2018 |
| WO | 2001005852 A1 | 1/2001 |
| WO | 2010049167 A1 | 5/2010 |
| WO | WO-2018131793 A1 * | 7/2018 ................ C08F 2/38 |
| WO | WO-2020122562 A1 * | 6/2020 ............ C08F 110/02 |

OTHER PUBLICATIONS

Search Report dated May 27, 2022 from Office Action for Chinese Application No. 202080010645.7 issued Jun. 2, 2022. 3 pgs.

International Search Report for PCT/KR2020/002467 mailed Jun. 2, 2020; 2 pages.

* cited by examiner

POLYETHYLENE HAVING HIGH PRESSURE RESISTANCE AND CROSSLINKED POLYETHYLENE PIPE COMPRISING THE SAME

CROSS-REFERENCE TO RELATED APPLICATION(S)

This application is a national phase entry under 35 U.S.C. § 371 of International Application No. PCT/KR2020/002467 filed Feb. 20, 2020, which claims priority from Korean Patent Application No. 10-2019-0020026 filed Feb. 20, 2019, and Korean Patent Application No. 10-2020-0020643 filed Feb. 19, 2020, all of which are incorporated herein by reference.

BACKGROUND OF THE INVENTION

(A) Field of the Invention

The present disclosure relates to a polyethylene having high pressure resistance and a crosslinked polyethylene pipe comprising the same.

(b) Description of the Related Art

Crosslinked polyethylene was developed by an electric wire company in 1960 to improve the temperature characteristics by heat generation of an electric wire, and German Thomas Engel has produced a pipe having excellent durability using this polyethylene in 1967.

The crosslinked polyethylene is one that is modified into polyethylene having a three-dimensional network structure by crosslinking high density polyethylene (HDPE) having a linear molecular structure, and has excellent characteristics such as heat resistance, durability, chemical resistance, and flexibility.

On the other hand, as the method of crosslinking polyethylene in this way, there may be mentioned a crosslinking method using an organic peroxide (peroxide crosslinking), a crosslinking method using a silane compound (silane crosslinking), and a crosslinking method using an electron beam irradiation (radiation crosslinking).

In general, polyethylene crosslinked by organic peroxide is referred to as PE-Xa, polyethylene crosslinked by a silane compound is referred to as PE-Xb, and polyethylene crosslinked by an electron beam irradiation is referred to as PE-Xc.

Since the crosslinked polyethylene pipe, particularly PE-Xa pipe, requires uniform and high pressure during extrusion molding, it is usually produced by extrusion-molding a mixture of a polyethylene resin, a crosslinking agent, an antioxidant, and the like with a RAM type extruder.

In the case of PE-Xa, it has superior physical properties compared to PE-Xb and PE-Xc, and has the advantage of being able to produce flexible pipe products.

On the other hand, in order to satisfy the pressure resistance characteristics among the physical properties required for pipe products, polyethylene needs to have a high density, but for this purpose, polyethylene with a high melt index is suitable. This is because as the melt index is higher, the chain mobility is enhanced and the density is higher. However, polyethylene having a high melt index has a disadvantage that a large amount of low molecular weight is produced and thus, the degree of crosslinking is lowered.

Therefore, there is a need to develop a crosslinked polyethylene pipe having excellent degree of crosslinking while having high melt index and high density.

SUMMARY OF THE INVENTION

Technical Problem

Therefore, the present disclosure has been made in view of the above-mentioned problems, and the object of the present disclosure is to provide a polyethylene which not only has a high melt index and density and thus improves pressure resistance, but also exhibits excellent degree of crosslinking and thus has excellent physical properties as a pipe, and a crosslinked polyethylene pipe comprising the same.

Technical Solution

In order to achieve that above object, according to one embodiment of the present disclosure, there is provided a polyethylene which satisfies:
a density of 0.940 g/cm$^3$ or more and 0.960 g/cm$^3$ or less as measured according to ASTM D792;
a number average molecular weight (Mn) of 20,000 g/mol or more and 70,000 g/mol or less;
a weight average molecular weight (Mw) of 100,000 g/mol or more and 250,000 g/mol or less;
a polydispersity index (PDI, Mw/Mn) of 2.5 or more and 3.7 or less; and
a melt index (MI$_{21.6}$) of 1 g/10 min or more and 20 g/10 min or less as measured at a temperature of 190° C. under a load of 21.6 kg according to ASTM D1238.

According to another embodiment of the present disclosure, there is provided a crosslinked polyethylene pipe including the polyethylene.

Advantageous Effects

The polyethylene according to the present disclosure has a high density and exhibits a sufficient degree of crosslinking, thereby exhibiting excellent strength and pressure resistance.

Therefore, it can be usefully used in the production of crosslinked polyethylene pipes, especially PE-Xa pipes.

DETAILED DESCRIPTION OF THE EMBODIMENTS

As used herein, terms such as first, second, and the like may be used to describe various components, and the terms are used only to discriminate one component from another component.

Also, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, steps, constitutional elements, or combinations thereof, but it should be understood that they do not preclude a possibility of existence or addition of one or more other features, steps, constitutional elements, or combinations thereof.

Since the present disclosure may be modified in various forms and may have several embodiments, particular embodiments will be illustrated and described in detail below. However, it will be understood that the present disclosure is not limited to the particular embodiments but the invention includes all modifications, equivalents, and alternatives falling within the scope and sprit of the present disclosure.

Hereinafter, the polyethylene of the present disclosure and a crosslinked polyethylene pipe comprising the same will be described in more detail.

The polyethylene according to one embodiment of the present disclosure is characterized in that a density measured according to ASTM D792 is 0.940 g/cm$^3$ or more and 0.960 g/cm$^3$ or less; a number average molecular weight (Mn) is 20,000 g/mol or more and 70,000 g/mol or less; a weight average molecular weight (Mw) is 100,000 g/mol or more and 250,000 g/mol or less; a polydispersity index (PDI, Mw/Mn) is 2.5 or more and 3.7 or less; and a melt index (MI$_{21.6}$) is 1 g/10 min or more and 20 g/10 min or less as measured at a temperature of 190° C. under a load of 21.6 kg according to ASTM D1238.

The crosslinked polyethylene is one that is modified into polyethylene having a three-dimensional network structure by crosslinking high density polyethylene (HDPE) having a linear molecular structure, and has excellent characteristics such as heat resistance, durability, chemical resistance, and flexibility.

Pipes produced from such crosslinked polyethylene are usually produced by mixing polyethylene with a crosslinking agent and an antioxidant and then extrusion-molding the mixture with a RAM type extruder.

Among the pipes produced from the crosslinked polyethylene in this way, PE-Xa has superior physical properties compared to PE-Xb and PE-Xc, and has the advantage of being able to produce flexible pipe products.

On the other hand, in order to satisfy the pressure resistance characteristics among the physical properties required for pipe products, polyethylene needs to have a high density, but polyethylene with a high melt index has a disadvantage that a large amount of low molecular weight is produced and the degree of crosslinking is lowered.

Therefore, the present disclosure has been designed to further improve the pressure resistance of PE-Xa pipes, and the inventors have developed a polyethylene resin suitable for use in PE-Xa pipes in which the molecular weight distribution of polyethylene is improved, the melt index (MI) and density are increased at the same time than before, and thus, the degree of crosslinking is not reduced and is maintained at 70% or more while exhibiting improved pressure resistance, thereby completing the present disclosure.

Specifically, the polyethylene according to an embodiment of the present disclosure may be high density polyethylene (HDPE) having a density of 0.940 g/cm$^3$ or more and 0.960 g/cm$^3$ or less as measured according to ASTM D792.

More specifically, according to one embodiment, the density of the polyethylene of the present disclosure may be 0.940 g/cm$^3$ or more, or 0.945 g/cm$^3$ or more, or 0.949 g/cm$^3$ or more, or 0.950 g/cm$^3$ or more, and 0.960 g/cm$^3$ or less, or 0.958 g/cm$^3$ or less, or 0.956 g/cm$^3$ or less, or 0.955 g/cm$^3$ or less. By having the density range as described above, the polyethylene of the present disclosure can satisfy excellent pressure resistance characteristics.

Further, the polyethylene according to an embodiment of the present disclosure has a number average molecular weight (Mn) of 20,000 to 70,000 g/mol. More specifically, the number average molecular weight may be 20,000 g/mol or more, or 25,000 g/mol or more, or 30,000 g/mol or more, or 33,000 g/mol or more, and 70,000 g/mol or less, or 65,000 g/mol or less, or 60,000 g/mol or less, or 57,000 g/mol or less, or 55,000 g/mol or less.

Further, the polyethylene according to an embodiment of the present disclosure has a weight average molecular weight (Mw) of 100,000 to 250,000 g/mol. More specifically, the weight average molecular weight may be 100,000 g/mol or more, or 120,000 g/mol or more, or 125,000 g/mol or more, or 130,000 g/mol or more, and 250,000 g/mol or less, or 230,000 g/mol or less, or 220,000 g/mol or less, or 210,000 g/mol or less, or 200,000 g/mol or less.

Further, the polyethylene according to an embodiment of the present disclosure has a molecular weight distribution (MWD, Mw/Mn) of 2.5 to 3.7. More specifically, the molecular weight distribution may be 2.5 or more, or 2.6 or more, or 2.7 or more, or 2.8 or more, and 3.7 or less, or 3.6 or less, or 3.5 or less, or 3.4 or less.

By having the molecular weight distribution as described above, the polyethylene of the present disclosure can satisfy high crosslinking properties.

In the present disclosure, the number average molecular weight (Mn), the weight average molecular weight (Mw), and the molecular weight distribution are measured in which the weight average molecular weight (Mw) and the number average molecular weight (Mn) of polyethylene are respectively measured using gel permeation chromatography (GPC), and the ratio of the weight average molecular weight to the number average molecular weight (Mw/Mn) was calculated as the polydispersity index.

Specifically, a polyethylene sample was evaluated using a Waters PL-GPC220 instrument using a PLgel Mixed-B column (300 mm in length) from Polymer Laboratories, wherein an evaluation temperature is set to 160° C., 1,2,4-trichlorobenzene is uses as a solvent, and a flow rate is set to 1 mL/min. In addition, a sample is prepared at a concentration of 10 mg/10 mL, and then supplied in an amount of 200 μL. A calibration curve formed by using a polystyrene standard is used to determine Mw and Mn values. The molecular weight of the polystyrene standard used was nine types of 2,000/10,000/30,000/70,000/200,000/700,000/2,000,000/4,000,000/10,000,000.

Further, the polyethylene according to an embodiment of the present disclosure has a melt index (MI$_{21.6}$) of 1 to 20 g/10 min as measured at a temperature of 190° C. under a load of 21.6 kg according to the ASTM D1238 standard. More specifically, the melt index (MI$_{21.6}$) may be 3 g/10 min or more, or 4 g/10 min or more, or 5 g/10 min or more, or 6 g/10 min or more, and 18 g/10 min or less, or 16 g/10 min or less, or 15 g/10 min or less, or 14 g/10 min or less.

By having the range of the melt index (MI$_{21.6}$) as described above, the polyethylene of the present disclosure can satisfy excellent pressure resistance characteristics.

Further, the polyethylene according to an embodiment of the present disclosure may have an integration value in a region where log Mw value is 4.5 or less, of 25% or less of the total integration value, in a GPC curve graph in which the x axis is log Mw and the y axis is dw/dlog Mw. The GPC curve graph means that the logarithmic function molecular weight and mass fraction of polyethylene are measured by GPC and plotted on the x and y axes. Further, in the above, Mw means a weight-average molecular weight.

More specifically, according to an embodiment, the polyethylene of the present disclosure may have the integration value in a region where the Log Mw value is 4.5 or less, of 23% or less, 22% or less, or 21% or less, and 15% or more, or 16% or more, or 17% or more, or 18% or more, and 25% or less, 24% or less, or 22% or less of the total integration value.

As described above, the polyethylene of the present disclosure may have the integration value in the region where Log Mw value may be 4.5 or less, of 25% or less of the total integration value. The polyethylene has a higher melt index, excellent degree of crosslinking and pressure resistance as compared with conventional products having a similar low molecular weight content. Thus, due to such characteristics, it can satisfy high crosslinking degree properties.

On the other hand, polyethylene according to an embodiment of the present disclosure having the physical properties as described can be prepared by a preparation method comprising polymerizing an ethylene monomer in the presence of a specific metallocene compound as a catalytically active component.

More specifically, the polyethylene of the present disclosure may be prepared by polymerizing an ethylene monomer in the presence of a hybrid metallocene catalyst comprising, but not limited thereto, a first metallocene compound represented by the following Chemical Formula 1; and a second metallocene compound represented by the following Chemical Formula 3 in a molar ratio of 1:5 to 1:20.

[Chemical Formula 1]

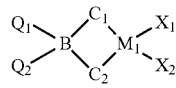

in the Chemical Formula 1, $Q_1$ and $Q_2$ are the same as or different from each other, and each independently represent hydrogen, a halogen, a C1 to C20 alkyl group, a C2 to C20 alkenyl group, a C2 to C20 alkoxyalkyl group, a C6 to C20 aryl group, a C7 to C20 alkylaryl group, or a C7 to C20 arylalkyl group;

B is carbon, silicon, or germanium;

$M_1$ is a Group 4 transition metal;

$X_1$ and $X_2$ are the same as or different from each other, and each independently represent a halogen, a C1 to C20 alkyl group, a C2 to C10 alkenyl group, a C6 to C20 aryl group, a C7 to C20 alkylaryl group, or a C7 to C20 arylalkyl group;

one of $C_1$ and $C_2$ is represented by the following Chemical Formula 2a or Chemical Formula 2b, and the other of C1 and C2 is represented by the following Chemical Formula 2c;

[Chemical Formula 2a]

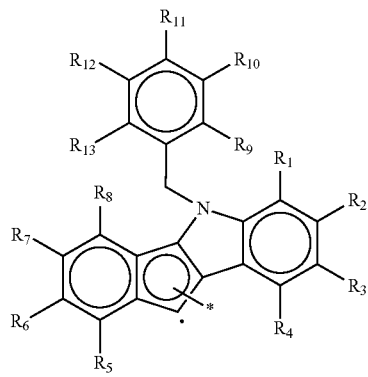

[Chemical Formula 2b]

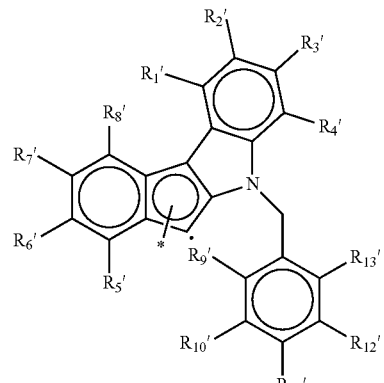

[Chemical Formula 2c]

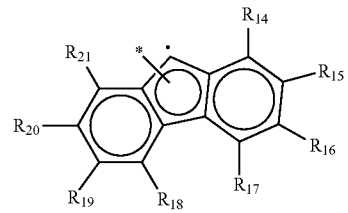

in the Chemical Formulas 2a, 2b and 2c, $R_1$ to $R_{21}$ and $R_1'$ to $R_{13}'$ are the same as or different from each other, and each independently represent hydrogen, a halogen, a C1 to C20 alkyl group, a C1 to C20 haloalkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, provided that at least one of $R_9$ to $R_{13}$ and $R_9'$ to $R_{13}'$ is a C1 to C20 haloalkyl group;

• represents a site of binding to B; and

* represents a site of binding to $M_1$,

[Chemical Formula 3]

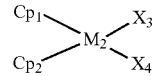

in the Chemical Formula 3, $M_2$ is a Group 4 transition metal;

$C_{p1}$ and $C_{p2}$ are the same as or different from each other, and each independently represent any one cyclic compound selected from the group consisting of cyclopentadienyl, indenyl, 4,5,6,7-tetrahydro-1-indenyl and fluorenyl, one or more hydrogens of the cyclic compound may be each independently substituted with any one substituent selected among a C1 to 20 alkyl, a C1 to C20 alkoxy, a C2 to C20 alkoxyalkyl, a C6 to C20 aryl, a C7 to C20 alkylaryl, or a C7 to C20 arylalkyl; and $X_3$ and $X_4$ are the same as or different from each other, and each independently represent a halogen, a C1 to C20 alkyl, a C2 to C10 alkenyl, a C6 to C20 aryl, a C7 to C20 alkylaryl, or a C7 to C20 arylalkyl.

The substituents of Chemical Formulas 1 and 2 will be described in more detail below.

The C1 to C20 alkyl group includes a linear or branched alkyl group, and specifically, a methyl group, an ethyl group, a propyl group, an isopropyl group, an n-butyl group, a tert-butyl group, a pentyl group, a hexyl group, a heptyl group, an octyl group, and the like may be mentioned, but is not limited thereto.

The C2 to C20 alkenyl group includes a linear or branched alkenyl group, and specifically, an allyl group, an ethenyl group, a propenyl group, a butenyl group, a pentenyl group, and the like may be mentioned, but is not limited thereto.

The C6 to C20 aryl group includes a monocyclic or condensed ring aryl group, and specifically, a phenyl group, a biphenyl group, a naphthyl group, a phenanthrenyl group, a fluorenyl group, and the like may be mentioned, but is not limited thereto.

The C1 to C20 alkoxy group may include, but not limited to, a methoxy group, an ethoxy group, a phenyloxy group, and a cyclohexyloxy group.

The C2 to C20 alkoxyalkyl group is a functional group in which at least one hydrogen of the alkyl group as described above is substituted with an alkoxy group, and specifically, alkoxyalkyl groups such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group and a tert-butoxyhexyl group; or aryloxyalkyl groups such as a phenoxyhexyl group may be mentioned, but is not limited thereto.

The C1 to C20 alkylsilyl group or the C1 to C20 alkoxysilyl group is a functional group in which 1 to 3 hydrogens of —$SiH_3$ are substituted with 1 to 3 alkyl or alkoxy groups as described above, and specifically, alkylsilyl groups such as a methylsilyl group, a dimethylsilyl group, a trimethylsilyl group, a dimethylethylsilyl group, a dimethylmethylsilyl group, or a dimethylpropylsilyl group; alkoxysilyl groups such as a methoxysilyl group, a dimethoxysilyl group, a trimethoxysilyl group or a dimethoxyethoxysilyl group; alkoxyalkylsilyl groups such as a methoxydimethylsilyl group, a diethoxymethylsilyl group, or a dimethoxypropylsilyl group may be mentioned, but is not limited thereto.

The C1 to C20 silylalkyl group is a functional group in which at least one hydrogen of the alkyl group as described above is substituted with a silyl group, and specifically, —$CH_2$—$SiH_3$, a methylsilylmethyl group, or a dimethylethoxysilylpropyl group may be mentioned, but are not limited thereto.

The halogen may be fluorine (F), chlorine (Cl), bromine (Br), or iodine (I).

The above-described substituents may be optionally substituted with one or more substituents selected from the group consisting of a hydroxy group; a halogen; an alkyl group or an alkenyl group, an aryl group, an alkoxy group; an alkyl or an alkenyl group, an aryl group, or an alkoxy group including at least one heteroatom selected among the heteroatoms of Groups 14 to 16; a silyl group; an alkylsilyl group or an alkoxysilyl group; a phosphine group; a phosphide group; a sulfonate group; and a sulfone group which are within a range exhibiting the same or similar effect as the desired effect.

The Group 4 transition metal may include titanium (Ti), zirconium (Zr), and hafnium (Hf), but are not limited thereto.

According to an embodiment of the present disclosure, $R_1$ to $R_{21}$ and $R_1'$ to $R_{13}'$ in Chemical Formulas 2a, 2b, and 2c may be each independently hydrogen, a halogen, a C1 to C20 alkyl group, or a C1 to C20 haloalkyl group, and at least one of $R_9$ to $R_{13}$ and $R_9'$ to $R_{13}'$ may be a C1 to C20 haloalkyl group.

More specifically, $R_1$ to $R_{21}$ and $R_1'$ to $R_{13}'$ may be each independently hydrogen, a methyl group, an ethyl group, a propyl group, an isopropyl group, an n-butyl group, a tert-butyl group, a pentyl group, a hexyl group, a heptyl group, an octyl group, or a fluoroalkyl group, and at least one of $R_9$ to $R_{13}$ and $R_9'$ to $R_{13}'$ may be fluoroalkyl, but is not limited thereto.

According to an embodiment of the present disclosure $Q_1$ and $Q_2$ in Chemical Formula 1 may be each independently hydrogen, a halogen, a C1 to C20 alkyl group, or a C2 to C20 alkoxyalkyl group.

More specifically, $Q_1$ and $Q_2$ may be each independently hydrogen, a methyl group, an ethyl group, a propyl group, an isopropyl group, an n-butyl group, a tert-butyl group, a methoxymethyl group, a tert-butoxymethyl group, a tert-butoxyhexyl group, 1-ethoxyethyl group, 1-methyl-1-methoxyethyl group, a tetrahydropyranyl group or a tetrahydrofuranyl group, but are not limited thereto.

According to an embodiment of the present disclosure, B in Chemical Formula 1 is preferably silicon, but is not limited thereto.

According to an embodiment of the present disclosure, $X_1$ and $X_2$ in Chemical Formula 1 may be each independently a halogen or a C1 to C20 alkyl group.

The first metallocene compound of Chemical Formula 1 forms a structure in which an indeno-indole derivative and a cyclopentadiene derivative are asymmetrically crosslinked by a bridge, and by having a non-shared electron pair capable of functioning as a Lewis base in the ligand structure, it is supported on the surface having Lewis acid properties of the support, and exhibits high polymerization activity even when supported. Further, by including the electronically rich indeno-indole group and cyclopentadiene group, the activity is high, and excellent copolymerization property and high activity are maintained due to appropriate steric hindrance and the electronic effect of the ligand. Moreover, beta-hydrogen of the polymer chain in which the nitrogen atom of the indeno-indole derivative grows can be stabilized by hydrogen bonding to suppress beta-hydrogen elimination and polymerize an ultra-high molecular weight polyolefin.

In particular, one or more of $R_9$ to $R_{13}$ and $R_9'$ to $R_{13}'$ in the transition metal compound of Chemical Formula 1 includes a C1-C20 haloalkyl group. Further, haloalkyl groups containing halogen elements other than fluorine may also interact with beta-hydrogen, but hydrogen forms a hydrogen bond with highly electronegative atoms such as nitrogen, oxygen, and fluorine. All haloalkyl groups do not form a hydrogen bond with beta-H. It does not form a hydrogen bond with beta-H by including a haloalkyl group, but is an effect exhibited by introducing a fluorine substituent. For example, a fluoroalkyl group, that is, $CF_3$, etc. may be mentioned. It acts like the nitrogen atom of the indeno-indole derivative, stabilizes beta-hydrogen of a growing polymer chain by hydrogen bonding, further suppresses beta-hydrogen elimination, and more effectively can achieve the polymerization of the ultra-high molecular weight polyolefin. In other words, it maintains the basic skeleton of the catalyst in which the indeno-indole derivative and the cyclopentadiene derivative are asymmetrically crosslinked by a bridge, and by introducing substituents such as $CF_3$ which is a stronger hydrogen bond acceptor, beta-hydrogen is stabilized by hydrogen bonding, thereby enhancing the effect of suppressing beta-hydrogen elimination and enabling the polymerization of ultra-high molecular weight polyolefin.

According to an embodiment of the present disclosure, specific examples of the compound represented by Chemical Formula 2a may include a compound represented by the following structural formula, but the present disclosure is not limited thereto.

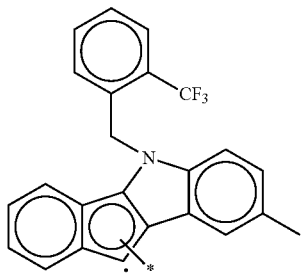

According to an embodiment of the present disclosure, specific examples of the compound represented by Chemical Formula 2b may be a compound represented by the following structural formula, but the present disclosure is not limited thereto.

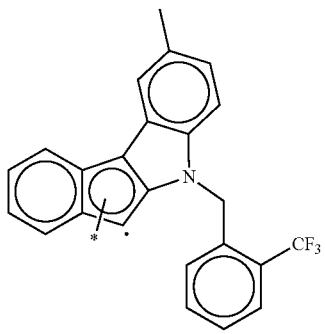

According to an embodiment of the present disclosure, specific examples of the compound represented by Chemical Formula 2c may include a compound represented by one of the following structural formulas, but the present disclosure is not limited thereto.

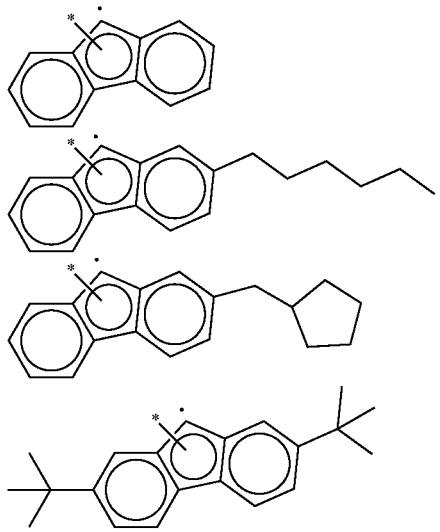

According to an embodiment of the present disclosure, specific examples of the first metallocene compound represented by Chemical Formula 1 may include a compound represented by Chemical Formula 1-1, but the present disclosure is not limited thereto.

[Structural Formula 1-1]

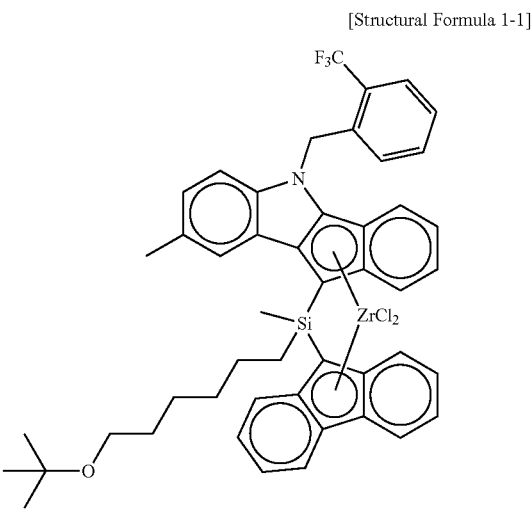

The first metallocene compound may be synthesized by applying known reactions, and for a more detailed synthesis method, please refer to Examples.

According to an embodiment of the present disclosure, $Cp_1$ and $Cp_2$ in Chemical Formula 3 may be each independently cyclopentadienyl or indenyl, and at least one hydrogen of the cyclopentadienyl or indenyl may be each independently substituted with any one substituent selected among a C1 to 20 alkyl or a C2 to C20 alkoxyalkyl.

According to an embodiment of the present disclosure, $M_2$ in Chemical Formula 3 is preferably zirconium (Zr), but the present disclosure is not limited thereto.

According to an embodiment of the present disclosure, $X_3$ and $X_4$ in Chemical Formula 3 may be each independently a halogen or a C1 to C20 alkyl group.

The second metallocene compound represented by Chemical Formula 3 may be, for example, a compound represented by one of the following structural formulas, but the present disclosure is not limited thereto.

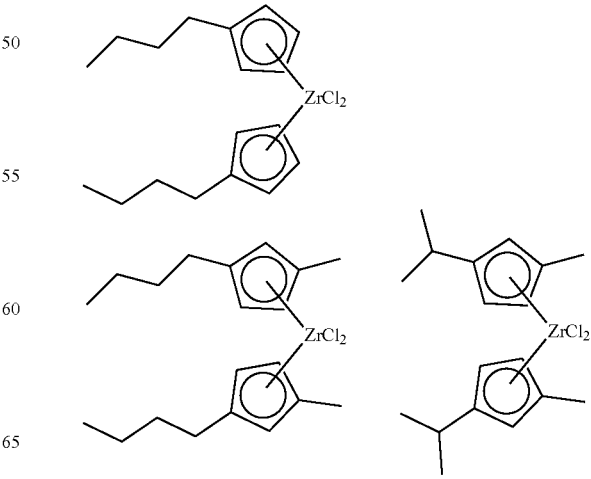

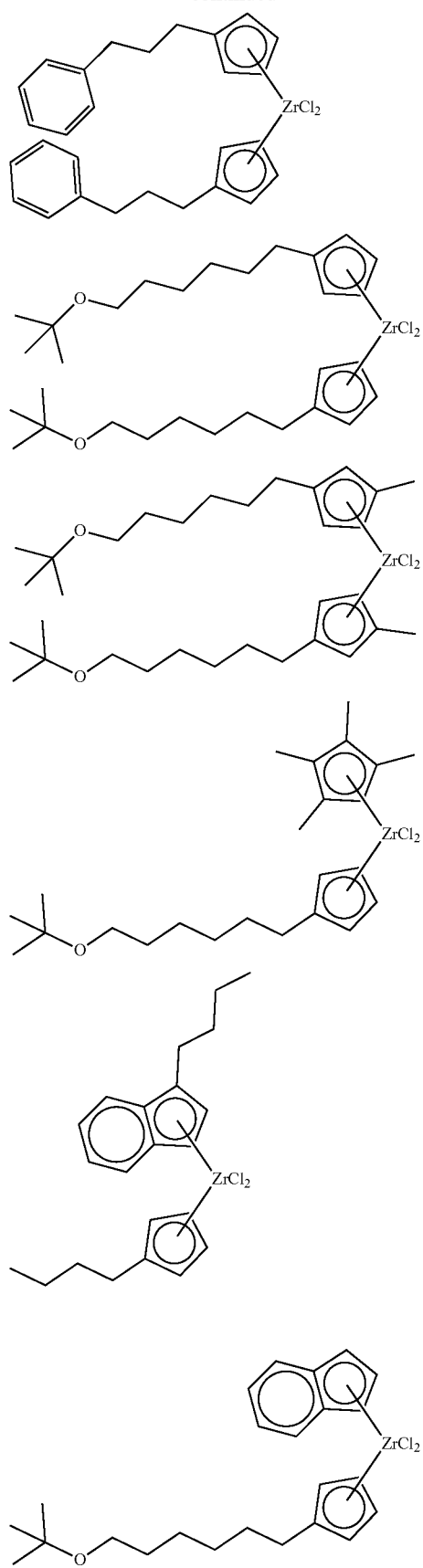
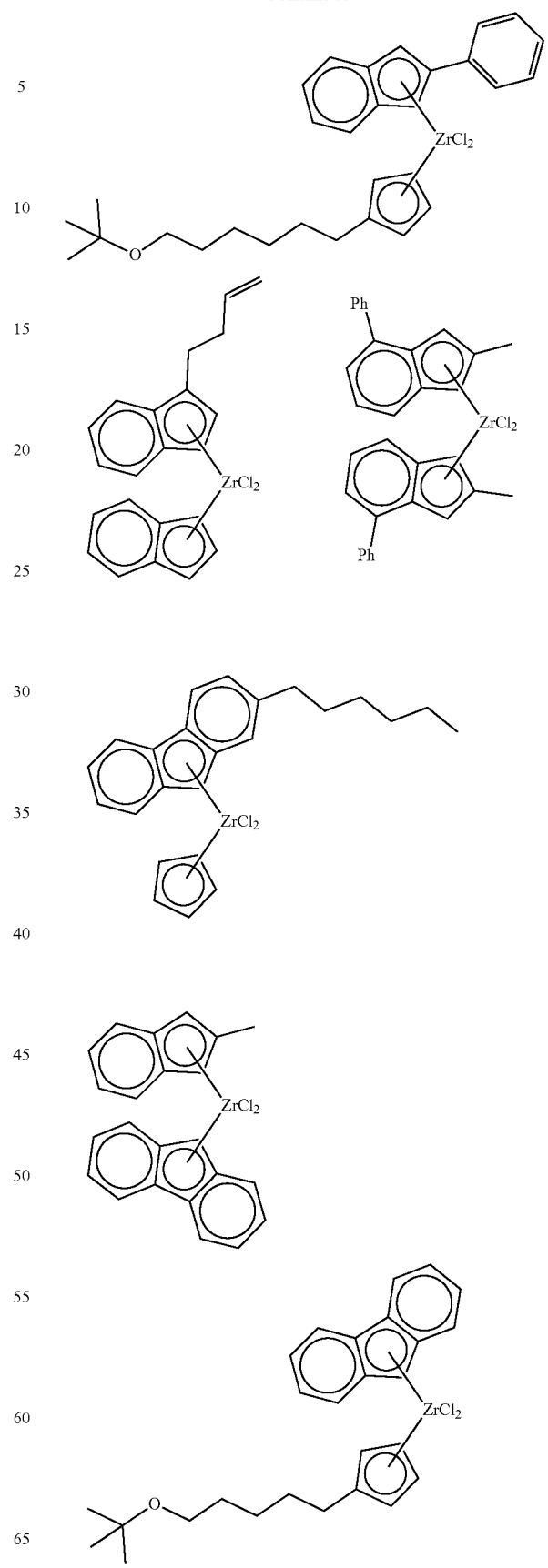

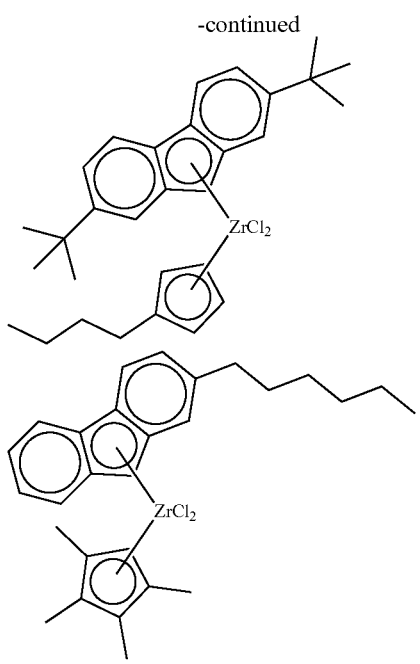

Further, the second metallocene compound represented by Chemical Formula 3 may be more preferably represented by the following Formula 3-1:

[Chemical Formula 3-1]

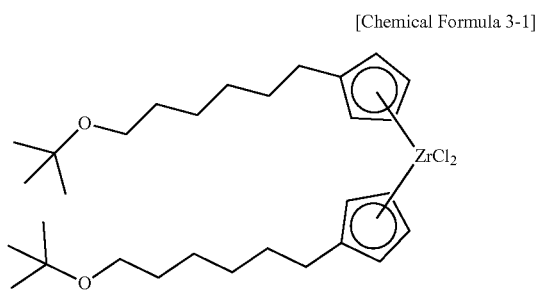

The second metallocene compound represented by Chemical Formula 3 may be synthesized by applying known reactions, and for a more detailed synthesis method, refer to Examples.

In the hybrid metallocene catalyst according to an embodiment of the present disclosure, the first metallocene compound represented by Chemical Formula 1 can mainly contribute to the expression of high molecular weight polyethylene, and the second metallocene compound represented by Chemical Formula 3 can mainly contribute to the expression of low molecular weight polyethylene with a narrow molecular weight distribution.

As the hybrid metallocene catalyst according to an embodiment of the present disclosure uses as a hybrid metallocene catalyst using a metallocene compound with a low molecular weight expression having a narrow polydispersity index and a metallocene compound with a high molecular weight expression together, it is advantageous for polymerizing the polyethylene of the present disclosure described above.

In the hybrid metallocene catalyst of the present disclosure, the molar ratio between the first metallocene compound represented by Chemical Formula 1 and the second metallocene compound represented by Chemical Formula 3 may be 1:5 to 1:20, or 1:7 to 1:18, or 1:8 to 1:15. At this time, when the molar ratio of the first and second metallocene compounds exceeds 1:20 and the content of the second metallocene compound is too large, the ratio of low molecular weight expression becomes too large and thus, the crosslinking property may be deteriorated. When the molar ratio is less than 1:5 and the content of the second metallocene compound is too small, the chain mobility is reduced and the density of polyethylene is reduced which may deteriorate pressure resistance. Therefore, from such a viewpoint, the molar ratio of the first and second metallocene compounds may be preferably in the above-described range.

In the hybrid metallocene catalyst used in the present disclosure, one or more of the first metallocene compound represented by Chemical Formula 1 and one or more of the second metallocene compound represented by Chemical Formula 3 may be supported on respective supports together with a cocatalyst compound.

In the hybrid metallocene catalyst of the present disclosure, the cocatalyst supported together on the support for activating the first and second metallocene compounds is an organometallic compound containing a Group 13 metal, and it is not particularly limited as long as it can be used when polymerizing olefins under a general metallocene catalyst.

Specifically, the cocatalyst compound may include at least one selected among an aluminum-containing first cocatalyst of the following Chemical Formula 4 and a borate-based second cocatalyst of the following Chemical Formula 5.

$$-[Al(R_a)-O-]_k-$$ [Chemical Formula 4]

in the Chemical Formula 4, each $R_a$ is independently a halogen, a halogen-substituted or unsubstituted hydrocarbyl group having 1 to 20 carbon atoms, and k is an integer of 2 or more, $$T^+[BG_4]^-$$ [Chemical Formula 5]

in the Chemical Formula 5, $T^+$ is a +1 charge polyatomic ion, B is boron in an oxidation state of +3, each G is independently selected from the group consisting of a hydride group, a dialkylamido group, a halide group, an alkoxide group, an aryloxide group, a hydrocarbyl group, a halocarbyl group, and a halo-substituted hydrocarbyl group, wherein the G has 20 or less carbon atoms, provided that G is a halide at one or less position.

By using the first and second cocatalysts as described above, the polymerization activity can be further enhanced.

The first cocatalyst of Chemical Formula 4 may be an alkylaluminoxane-based compound wherein the repeating units are combined into a linear, circular, or network form. Specific examples of the first cocatalyst include methylaluminoxane (MAO), ethylaluminoxane, isobutylaluminoxane, butylaluminoxane, and the like.

Further, the second cocatalyst of Chemical Formula 5 may be a trisubstituted ammonium salt, a dialkylammonium salt, or a trisubstituted phosphate type of borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium) tetraphenylborate, trimethylammonium tetrakis(pentafluorophenyl)borate, methylditetradecylammonium tetrakis (pentaphenyl)borate, methyldioctadecylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl(2,4,6-trimethylanilinium) tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, tri(n-butyl) ammonium tetrakis(2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl) borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

In the metallocene catalyst according to the present disclosure, the mass ratio of the support relative to the total weight of the transition metals contained in the first and second metallocene compounds may be 1:10 to 1:1,000. When the support and the metallocene compound are contained in the range of the above mass ratio, an optimal shape can be provided. Further, the mass ratio of the cocatalyst compound to the support may be 1:1 to 1:100.

In the metallocene catalyst according to the present disclosure, as the support, a support containing a hydroxy group on its surface can be used, and preferably a support having a highly reactive hydroxy group and siloxane group, of which the surface is dried and removed of moisture, can be used.

For example, silica, silica-alumina, silica-magnesia, or the like, which are dried at high temperature, can be used, and they may typically contain oxides, carbonates, sulfates, and nitrates such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains excessive moisture such that moisture on the surface is reacted with the cocatalyst. If the drying temperature is higher than 800° C., pores on the surface of the support are combined with each other to reduce the surface area, and many hydroxyl groups are lost on the surface to leave only siloxane groups. Thus, since the reactive sites with cocatalyst are reduced, it is not preferable.

The amount of hydroxyl groups on the surface of the support is preferably 0.1 to 10 mmol/g, and more preferably 0.5 to 5 mmol/g. The amount of hydroxyl groups on the surface of the support may be controlled depending on the preparation method and conditions of the support, or drying conditions such as temperature, time, vacuum, spray drying, and the like.

If the amount of hydroxyl groups is less than 0.1 mmol/g, the reactive sites with the cocatalyst are reduced. If the amount of hydroxyl groups is more than 10 mmol/g, it is not desirable because it may be caused by moisture in addition to the hydroxyl groups present on the surface of support particles.

Meanwhile, the polyethylene according to the present disclosure can be prepared by polymerizing an ethylene monomer in the presence of the above-described hybrid metallocene catalyst.

Alternatively, according to an embodiment of the present disclosure, it may be prepared by copolymerizing an ethylene monomer and another olefinic comonomer together.

Specific examples of the olefinic monomer may include 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, and the like, and these monomers may be copolymerized by mixing two or more thereof.

In the case where the olefinic polymer is an ethylene/alpha-olefin copolymer, the content of alpha-olefin as a comonomer is not particularly limited, and it may be appropriately selected according to the use or purpose of the olefinic polymer.

The polymerization reaction may be carried out by polymerizing monomers, using a continuous slurry polymerization reactor, a loop slurry reactor, a gas phase reactor, or a solution reactor.

And, the polymerization temperature may be about 25 to about 500° C., preferably about 25 to about 200° C., and more preferably about 50 to about 150° C. Further, the polymerization pressure may be from about 1 to about 100 Kgf/cm², preferably from about 1 to about 50 Kgf/cm², and more preferably from about 5 to about 30 Kgf/cm².

The metallocene catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. It is preferable that the solvent is used after a small amount of water, air, or the like acting as a catalyst poison is removed by treating with a small amount of aluminum. It can also be performed by further using a cocatalyst.

According to another embodiment of the present disclosure, a crosslinked polyethylene pipe including the polyethylene is provided.

The crosslinked polyethylene pipe of the present disclosure may be produced by subjecting the above-mentioned polyethylene to RAM extrusion molding. The RAM extrusion molding is used in the extrusion molding field where uniform and high pressure is required, and has the effect of processing a high molecular weight polyethylene resin during production of a crosslinked polyethylene pipe, as compared with a screw-type extrusion molding.

The RAM extrusion molding may be performed by a method used for producing a conventional crosslinked polyethylene pipe, and is not particularly limited.

Further, in the production of the crosslinked polyethylene pipe, a conventional crosslinking agent and an antioxidant can be mixed together with the polyethylene of the present disclosure to perform extrusion.

As the crosslinking agent, an organic peroxide crosslinking agent may be used. Specific examples of the organic peroxide crosslinking agent may include di-t-butyl peroxide (DTBP), dicumyl peroxide, di-t-amyl peroxide, 2,5-dimethyl-2,5-di(t-butylperoxy) hexane, and the like, but the present disclosure is not limited thereto. Further, the content of the crosslinking agent is not particularly limited, but it may be contained in an amount of 0.4 to 1 part by weight based on 100 parts by weight of polyethylene.

As the antioxidant, a phenolic antioxidant may be used. Specific examples of the phenolic antioxidant may include IRGANOX1076, IRGANOX1010, BHT, songnox 1076, and the like, but the present disclosure is not limited thereto. In addition, the content of the antioxidant is not particularly limited, but it may be contained in an amount of 0.1 to 0.6 parts by weight based on 100 parts by weight of polyethylene.

Further, the crosslinked pipe may be a PE-Xa pipe.

Further, the crosslinked polyethylene pipe according to an embodiment of the present disclosure may have a degree of crosslinking of 70% or more as measured according to KS M ISO 10147.

More specifically, according to one embodiment, the crosslinked polyethylene pipe of the present disclosure has a degree of crosslinking of 70% or more, or 75% or more, or 77% or more, or 80% or more, or 81% or more, or 82% or more, or 83% or more, and 99% or less, or 96% or less, or 93% or less as measured according to KS M ISO 10147.

By having the high degree of crosslinking of 70% or more as described above, the crosslinked polyethylene pipe of the present disclosure may have excellent mechanical strength.

Further, the crosslinked polyethylene pipe according to an embodiment of the present disclosure may have a hoop stress of 18.5 MPa or more as measured according to ISO 1167-1.

More specifically, according to one embodiment, the crosslinked polyethylene pipe of the present disclosure has a hoop stress of 18.5 MPa or more, or 18.7 MPa or more, and 25 MPa or less, 24 MPa or less, or 22 Mpa or less.

As described above, the crosslinked polyethylene pipe of the present disclosure may have excellent pressure resistance.

Hereinafter, preferred embodiments are presented to aid in understanding the present disclosure. However, the following examples are provided for a better understanding of the present disclosure, and the contents of the present disclosure are not limited thereto.

EXAMPLE

Synthesis Example of Metallocene Compound

Synthesis Example 1: Synthesis of First Metallocene Compound

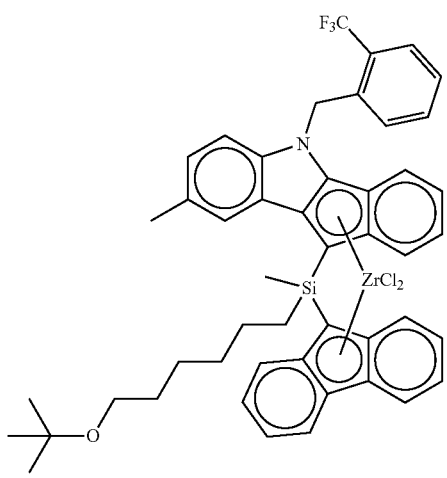

1-1 Preparation of Ligand Compound 2.9 g (7.4 mmol) of 8-methyl-5-(2-(trifluoromethyl)benzyl)-5,10-dihydroindeno[1,2-b]indole was dissolved in 100 mL of hexane and 2 mL (16.8 mmol) of MTBE (methyl tertiary butyl ether), and 3.2 mL (8.1 mmol) of a 2.5 M n-BuLi hexane solution was added dropwise in a dry ice/acetone bath, and then the mixture was stirred at room temperature overnight. 2 g (7.4 mmol) of (6-tert-butoxyhexyl) dichloro(methyl)silane was dissolved in 50 mL of hexane in another 250 mL Schlenk flask, and then added dropwise in a dry ice/acetone bath, and a lithiated slurry of 8-methyl-5-(2-(trifluoromethyl) benzyl)-5,10-dihydroindeno[1,2-b]indole was added dropwise via a cannula. After the injection was completed, the mixture was slowly raised to room temperature and then stirred at room temperature overnight. At the same time, 1.2 g (7.4 mmol) of fluorene was also dissolved in 100 mL of THF, and 3.2 mL (8.1 mmol) of 2.5 M n-BuLi hexane solution was added dropwise in a dry ice/acetone bath, and the mixture was stirred at room temperature overnight.

Reaction solution (Si solution) of 8-methyl-5-(2-(trifluoromethyl) benzyl)-5,10-dihydroindeno[1,2-b]indole and (6-(tert-butoxy) hexyl)dichloro(methyl)silane was subjected to NMR sampling to confirm the completion of the reaction.

$^1$H NMR (500 MHz, CDCl$_3$): 7.74-6.49 (11H, m), 5.87 (2H, s), 4.05 (1H, d), 3.32 (2H, m), 3.49 (3H, s), 1.50-1.25 (8H, m), 1.15 (9H, s), 0.50 (2H, m), 0.17 (3H, d)

After confirming the synthesis first, a lithiated solution of fluorene was slowly added dropwise to the Si solution in a dry ice/acetone bath, and then the mixture was stirred at room temperature overnight. After the reaction, extraction was performed with ether/water, and residual moisture in the organic layer was removed with MgSO$_4$, and then the solvent was removed under vacuum and reduced pressure conditions to obtain 5.5 g (7.4 mmol) of the oily ligand compound, which could be confirmed by $^1$H-NMR.

$^1$H NMR (500 MHz, CDCl$_3$): 7.89-6.53 (19H, m), 5.82 (2H, s), 4.26 (1H, d), 4.14-4.10 (1H, m), 3.19 (3H, s), 2.40 (3H, m), 1.35-1.21 (6H, m), 1.14 (9H, s), 0.97-0.9 (4H, m), −0.34 (3H, t).

1-2 Preparation of Metallocene Compound 5.4 g (Mw 742.00, 7.4 mmol) of the ligand compound synthesized in 1-1 was dissolved in 80 mL of toluene and 3 mL (25.2 mmol) of MTBE, and 7.1 mL (17.8 mmol) of 2.5 M n-BuLi hexane solution was added dropwise in a dry ice/acetone bath and stirred at room temperature overnight. 3.0 g (8.0 mmol) of ZrCl$_4$(THF)$_2$ was added to 80 mL of toluene to prepare a slurry. 80 mL of ZrCl$_4$(THF)$_2$ as a toluene slurry was transferred to a ligand-Li solution in a dry ice/acetone bath and stirred at room temperature overnight. The reaction mixture was filtered to remove LiCl, the filtrate was dried under vacuum to remove toluene, and then 100 mL of hexane was added thereto and sonicated for 1 hour. This was filtered to obtain 3.5 g of a purple metallocene compound as a filtered solid (yield 52 mol %).

$^1$H NMR (500 MHz, CDCl$_3$): 7.90-6.69 (9H, m), 5.67 (2H, s), 3.37 (2H, m), 2.56 (3H, s), 2.13-1.51 (11H, m), 1.17 (9H, s).

Synthesis Example 2

Synthesis of Second Metallocene Compound

Preparation of [tBu-O—(CH$_2$)$_6$—C$_5$H$_4$]$_2$ZrCl$_2$

Tert-Butyl-O—(CH$_2$)$_6$—Cl was prepared using 6-chlorohexanol by the method suggested in the literature [Tetrahedron Lett. 2951 (1988)], and reacted with NaCp to obtain t-Butyl-O—(CH$_2$)$_6$—C$_5$H$_5$ (yield: 60%, b.p. 80° C./0.1 mmHg).

Further, t-butyl-O—(CH$_2$)$_6$—C$_5$H$_5$ was dissolved in THF at −78° C., n-butyllithium (n-BuLi) was slowly added thereto, the reaction temperature was raised to room temperature, and the mixture was then allowed to react for 8 hours. The solution was again reacted in which the already synthesized lithium salt solution was slowly added to a suspension solution of ZrCl$_4$(THF)$_2$ (1.70 g, 4.50 mmol)/ THF (30 ml) at −78° C. and further reacted at room temperature for 6 hours.

All volatile substances were vacuum dried, and a hexane solvent was added to the obtained oily liquid substance and the mixture was filtered out. The filtered solution was vacuum dried, and then hexane was added thereto to induce a precipitate at low temperature (−20° C.). The obtained precipitate was filtered off at a low temperature to obtain a [tBu-O—(CH$_2$)$_6$—C$_5$H$_4$]$_2$ZrCl$_2$ compound as a white solid (yield: 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation Example of Hybrid Supported Catalyst

Preparation Example 1

5.0 kg of a toluene solution was added to a 20 L sus autoclave, and the reactor temperature was maintained at 40° C. 1000 g of silica (produced by Grace Davison, SP 948) was dehydrated by applying vacuum for 12 hours at a temperature of 600° C., and then added to a reactor to sufficiently disperse the silica. 55 g of the first metallocene compound of Synthesis Example 1 was then dissolved in toluene and then added thereto. The mixture was allowed to react while stirring at 200 rpm at 40° C. for 2 hours. Then, the stirring was stopped, and the reaction solution was settled for 30 minutes and decanted.

2.5 kg of toluene was added to the reactor, and 9.4 kg of a 10 wt % methylaluminoxane (MAO)/toluene solution was added thereto, and the mixture was stirred at 200 rpm at 40° C. for 12 hours. After the reaction, the stirring was stopped, and the reaction solution was settled for 30 minutes and decanted. 3.0 kg of toluene was added thereto and stirred for 10 minutes, then the stirring was stopped, and the reaction solution was settled for 30 minutes, and decanted.

3.0 kg of toluene was added to the reactor, and 142.3 g of the second metallocene compound of Synthesis Example 2 was dissolved in 1 L of a toluene solution and added to the reactor, and allowed to react while stirring at 40° C. at 200 rpm for 2 hours. After lowering the reactor temperature to room temperature, the stirring was stopped, and the reaction solution was settled for 30 minutes, and decanted.

2.0 kg of toluene was added to the reactor and stirred for 10 minutes. Then, the stirring was stopped, and the reaction solution was settled for 30 minutes, and decanted.

3.0 kg of hexane was added to the reactor, a hexane slurry was transferred to a filter dryer, and the hexane solution was filtered. The filtrate was dried under reduced pressure at 40° C. for 4 hours to prepare 1 kg of a SiO$_2$ hybrid supported catalyst (molar ratio between the first metallocene compound and the second metallocene compound was 1:10).

<Polyethylene Polymerization>

Example 1

The supported catalyst prepared in Preparation Example 1 was added to a single slurry polymerization process to prepare a high-density polyethylene.

First, hexane was injected at a flow rate of 25 ton/hr, ethylene at 10 ton/hr, hydrogen at 35 ppm (relative to ethylene), and triethyl aluminum (TEAL) at 10 kg/hr into a reactor with a capacity of 100 m$^3$, respectively. Further, the hybrid supported metallocene catalyst according to Preparation Example 1 was injected at 0.5 kg/hr. Then, ethylene was continuously reacted in the form of a hexane slurry at a reactor temperature of 82° C. and a pressure of 7.0 kg/cm$^2$ to 7.5 kg/cm$^2$, and then subjected to solvent removal and drying process to prepare high density polyethylene in powder form.

Example 2

The high-density polyethylene in powder form was prepared in the same manner as in Example 1, except that the amount of charged hydrogen was 25 ppm relative to ethylene.

Comparative Example 1

The polyethylene prepared using a Ziegler-Natta catalyst, XL1800 product by LG Chem, was used as Comparative Example 1.

Comparative Example 2

The polyethylene prepared using a Ziegler-Natta catalyst, 8100GX product by Lotte Chemical, was used as Comparative Example 2.

<Production of Crosslinked Polyethylene Pipe>

Example 3

100 g of polyethylene of Example 1 was mixed with 0.3 g of n-octadecyl-3-(3,5-di-tert.butyl-4-hydroxyphenyl)-propionate (product name Irganox 1076, produced by BASF) as an antioxidant and 0.6 g of di-tert-butyl peroxide (product name: Trigonox B, produced by Akzo Nobel) as a crosslinking agent, and dispersed using a Henschell Mixer (RPM 400, mixing time 15 min, mix temp<40° C.).

Subsequently, in order to produce the crosslinked polyethylene pipe, extrusion was performed with a Ram type extruder. At this time, the pipe diameter of the extruder was set to 20 mm and the thickness was set to 1.9 mm, and the temperature conditions were set to Body 130° C., Adapter 180° C., and Die −240° C. Further, the linear velocity during extrusion was set to 1.8 m/min.

Example 4

The crosslinked polyethylene pipe was produced in the same manner as in Example 3, except that the polyethylene of Example 2 was used instead of the polyethylene of Example 1.

Example 5

The crosslinked polyethylene pipe was prepared in the same manner as in Example 3, except that the polyethylene of Example 2 was used instead of the polyethylene of Example 1, and 0.5 g of di-tert-butyl peroxide (product name: Trigonox B, produced by Akzo Nobel) was used as a crosslinking agent.

Comparative Example 3

The crosslinked polyethylene pipe was prepared in the same manner as in Example 3, except that the polyethylene of Comparative Example 1 was used instead of the polyethylene of Example 1.

Comparative Example 4

The crosslinked polyethylene pipe was prepared in the same manner as in Example 3, except that the polyethylene of Comparative Example 1 was used instead of the polyethylene of Example 1, and 0.5 g of di-tert-butyl peroxide (product name: Trigonox B, produced by Akzo Nobel) was used as a crosslinking agent.

Comparative Example 5

The crosslinked polyethylene pipe was prepared in the same manner as in Example 3, except that the polyethylene of Comparative Example 2 was used instead of the polyethylene of Example 1

Experimental Example

Evaluation of Physical Properties

Physical properties of the polyethylene and the crosslinked polyethylene pipes produced in the Examples and Comparative Examples were evaluated by the following method.

molecular weight into the number average molecular weight.

Specifically, polyethylene sample was evaluated using a Waters PL-GPC220 instrument using a PLgel Mixed-B column (300 mm in length) from Polymer Laboratories, wherein an evaluation temperature was set to 160° C., 1,2,4-trichlorobenzene was used as a solvent, and a flow rate was set to 1 mL/min. In addition, a sample was prepared at a concentration of 10 mg/10 mL, and then supplied in an amount of 200 μL. A calibration curve formed by using a polystyrene standard was used to determine Mw and Mn values. The molecular weight of the polystyrene standard used was nine types of 2,000/10,000/30,000/70,000/200, 000/700,000/2,000,000/4,000,000/10,000,000.

(2) Melt Index ($MI_{21.6}$):

Measured according to the ASTM D1238 standard (Condition E, 190° C., 21.6 kg load).

(3) Density: Measured according to the ASTM D792 standard.

(4) Log Mw (≤4.5): It was calculated by the ratio of the integration value in a region where the Log Mw value is 4.5 or less relative to the entire area (integration value) of the entire GPC curve graph, through the GPC curve graph measured in the above (1).

(5) Degree of crosslinking: Measured according to KS M ISO 10147.

(6) Hoop stress

The pressure was increased at room temperature (25° C.) condition, the pressure at which ductile failure occurred within 5 minutes was measured, and calculated as a hoop stress. At this time, the pressure resistance test method was performed according to ISO 1167-1 in order to find the Hoop stress in which ductile failure occurred.

TABLE 1

| | Crosslinked polyethylene | | | | | |
|---|---|---|---|---|---|---|
| | Example 3 | Example 4 | Example 5 | Comparative Example 3 | Comparative Example 4 | Comparative Example 5 |
| | Polyethylene | | | | | |
| | Example 1 | Example 2 | Example 2 | Comparative Example 1 | Comparative Example 1 | Comparative Example 2 |
| Mn (g/mol) | 40,500 | 44,300 | 44,300 | 53,900 | 53,900 | 52,200 |
| Mw (g/mol) | 147,000 | 165,000 | 165,000 | 221,000 | 221,000 | 231,000 |
| MWD | 3.1 | 3.0 | 3.0 | 3.9 | 3.9 | 4.1 |
| $MI_{21.6}$ (g/10 min) | 10 | 7 | 7 | 2 | 2 | 1.5 |
| Density (g/cm$^3$) | 0.952 | 0.951 | 0.951 | 0.948 | 0.948 | 0.945 |
| Log MW ≤ 4.5 (%)* | 19 | 17 | 17 | 16 | 16 | 16 |
| Degree of crosslinking (%) | 86 | 88 | 87 | 87 | 86 | 75 |
| hoop stress (MPa) | 19.3 | 18.9 | 19.1 | 18.8 | 18.9 | 18.1 |

*the ratio of the integration value of the area where the log Mw value is 4.5 or less relative to the total integral value, in the GPC curve graph where the x-axis is log Mw and the y-axis is dw/dlogMw (1) Weight average molecular weight (Mw) and molecular weight distribution (MWD, polydispersity index), GPC curve: The weight average molecular weight (Mw) and the number average molecular weight (Mn) of the polymer were measured using a gel permeation chromatography (GPC; produced by Waters Corp.), and the polydispersity index (PDI) was calculated by dividing the weight average Referring to Table 1, the polyethylene of Examples 1 to 2 according to the present disclosure exhibited higher characteristics in terms of melt index ($MI_{21.6}$) and density than Comparative Examples.

Therefore, while the hoop stress of the crosslinked polyethylene of Examples 3 to 5 was high and the pressure resistance was improved, the degree of crosslinking was shown to be a level equivalent to Comparative Examples.

What is claimed is:

1. A polyethylene which satisfies:
a density of 0.940 g/cm³ or more and 0.960 g/cm³ or less as measured according to ASTM D792;
a number average molecular weight (Mn) of 20,000 g/mol or more and 70,000 g/mol or less;
a weight average molecular weight (Mw) of 100,000 g/mol or more and 250,000 g/mol or less;
a polydispersity index (PDI, Mw/Mn) of 2.5 or more and 3.7 or less; and
a melt index ($MI_{21.6}$) of 1 g/10 min or more and 20 g/10 min or less as measured at a temperature of 190° C. under a load of 21.6 kg according to ASTM D1238,
wherein the integration value in a region where a log Mw value is 4.5 or less is 25% or less of the total integration value in a GPC curve graph in which the x axis is log Mw and the y axis is dw/dlog Mw.

2. The polyethylene according to claim 1, wherein the weight average molecular weight (Mw) is 100,000 to 200,000 g/mol.

3. The polyethylene according to claim 1, which is prepared by polymerizing an ethylene monomer in the presence of a hybrid metallocene catalyst comprising a first metallocene compound represented by Chemical Formula 1; and a second metallocene compound represented by Chemical Formula 3, in a molar ratio of 1:5 to 1:20,

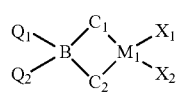

[Chemical Formula 1]

in Chemical Formula 1,
$Q_1$ and $Q_2$ are the same as or different from each other, and each independently represent hydrogen, a halogen, a C1 to C20 alkyl group, a C2 to C20 alkenyl group, a C2 to C20 alkoxyalkyl group, a C6 to C20 aryl group, a C7 to C20 alkylaryl group, or a C7 to C20 arylalkyl group;
B is carbon, silicon, or germanium;
$M_1$ is a Group 4 transition metal;
$X_1$ and $X_2$ are the same as or different from each other, and each independently represent a halogen, a C1 to C20 alkyl group, a C2 to C10 alkenyl group, a C6 to C20 aryl group, a C7 to C20 alkylaryl group, or a C7 to C20 arylalkyl group;
one of $C_1$ or $C_2$ is represented by Chemical Formula 2a or Chemical Formula 2b, and the other of C1 or C2 is represented by Chemical Formula 2c;

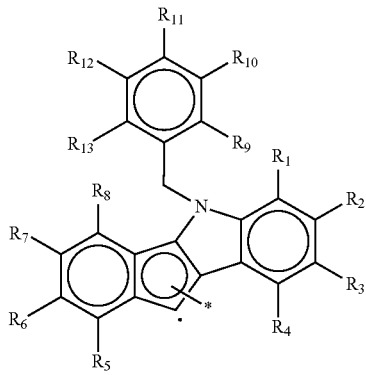

[Chemical Formula 2a]

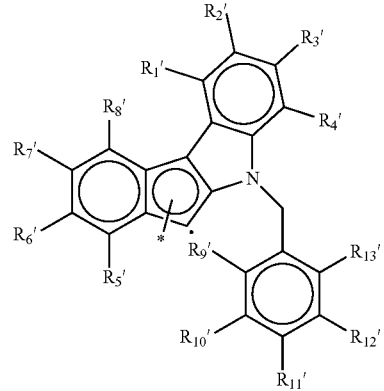

[Chemical Formula 2b]

[Chemical Formula 2c]

in Chemical Formulas 2a, 2b and 2c,
$R_1$ to $R_{21}$ and $R_1'$ to $R_{13}'$ are the same as or different from each other, and each independently represent hydrogen, a halogen, a C1 to C20 alkyl group, a C1 to C20 haloalkyl group, a C2 to C20 alkenyl group, a C1 to C20 alkylsilyl group, a C1 to C20 silylalkyl group, a C1 to C20 alkoxysilyl group, a C1 to C20 alkoxy group, a C6 to C20 aryl group, a C7 to C20 alkylaryl group, or a C7 to C20 arylalkyl group, provided that at least one of $R_9$ to $R_{13}$ and $R_9'$ to $R_{13}'$ is a C1 to C20 haloalkyl group;
• represents a site of binding to B; and
* represents a site of binding to $M_1$,

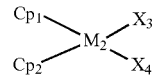

[Chemical Formula 3]

in Chemical Formula 3,
$M_2$ is a Group 4 transition metal;
$C_{p1}$ and $C_{p2}$ are the same as or different from each other, and each independently represent a cyclic compound selected from the group consisting of cyclopentadienyl, indenyl, 4,5,6,7-tetrahydro-1-indenyl and fluorenyl, one or more hydrogens of the cyclic compound are each independently substituted with any one substituent selected among a C1 to 20 alkyl, a C1 to C20 alkoxy, a C2 to C20 alkoxyalkyl, a C6 to C20 aryl, a C7 to C20 alkylaryl, or a C7 to C20 arylalkyl; and
$X_3$ and $X_4$ are the same as or different from each other, and each independently represent a halogen, a C1 to C20 alkyl, a C2 to C10 alkenyl, a C6 to C20 aryl, a C7 to C20 alkylaryl, or a C7 to C20 arylalkyl.

4. The polyethylene according to claim 3, wherein $R_1$ to $R_{21}$ and $R_1'$ to $R_{13}'$ in Chemical Formulas 2a, 2b and 2c each independently represent hydrogen, a halogen, a C1 to C20 alkyl group, or a C1 to C20 haloalkyl group.

5. The polyethylene according to claim 3, wherein the first metallocene compound represented by Chemical Formula 1 is a compound represented by Chemical Formula 1-1:

[Chemical Formula 1-1]

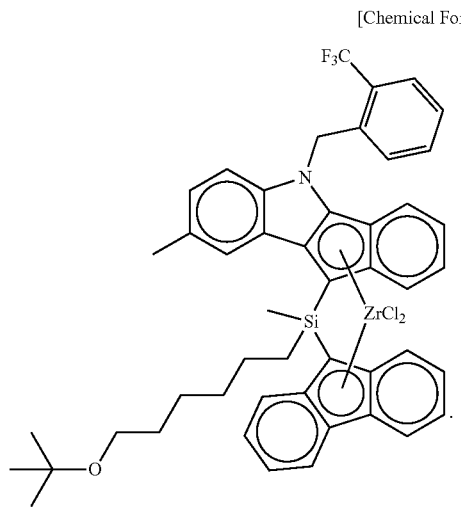

6. The polyethylene according to claim 3, wherein the second metallocene compound represented by Chemical Formula 3 is represented by one of the following structural formulas:

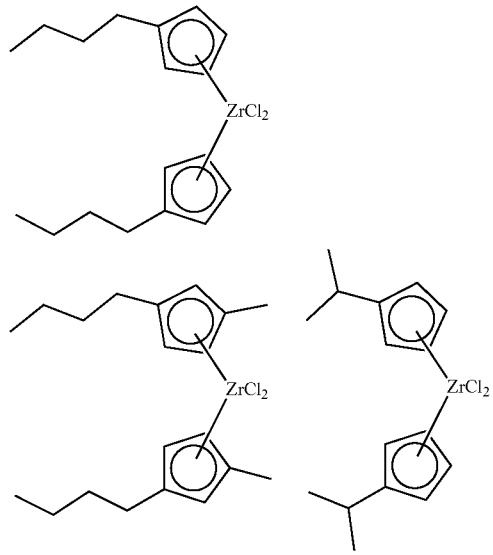

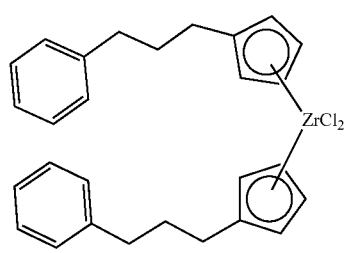

-continued

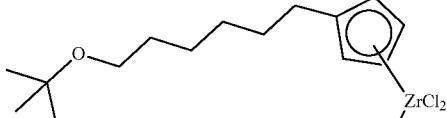

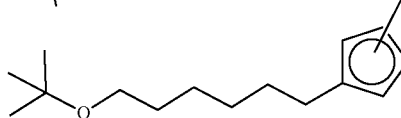

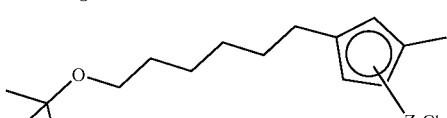

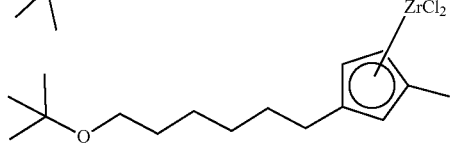

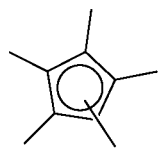

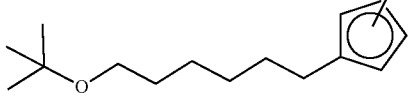

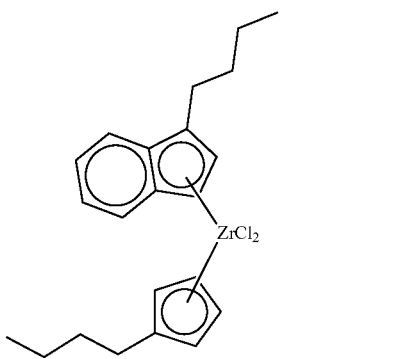

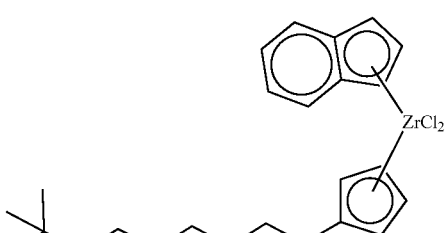

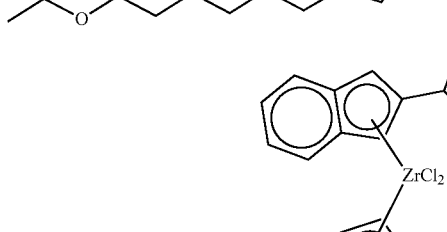

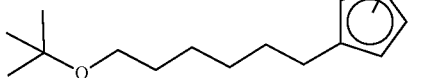

-continued

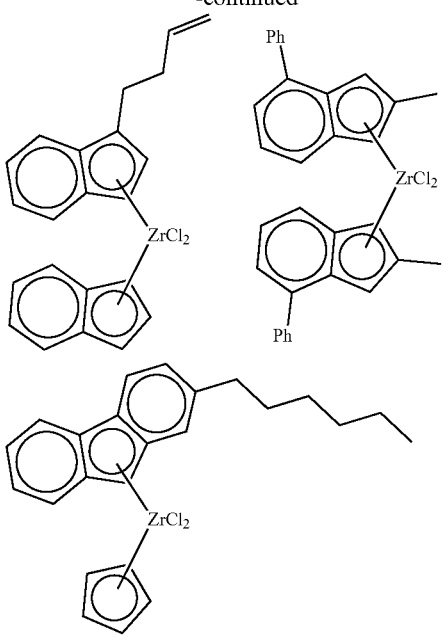

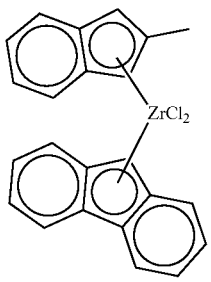

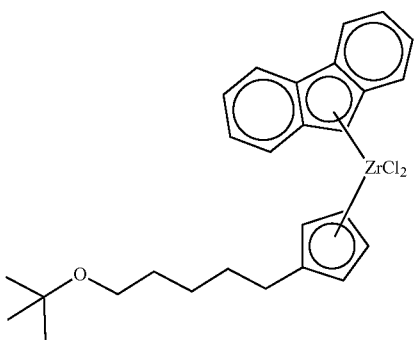

-continued

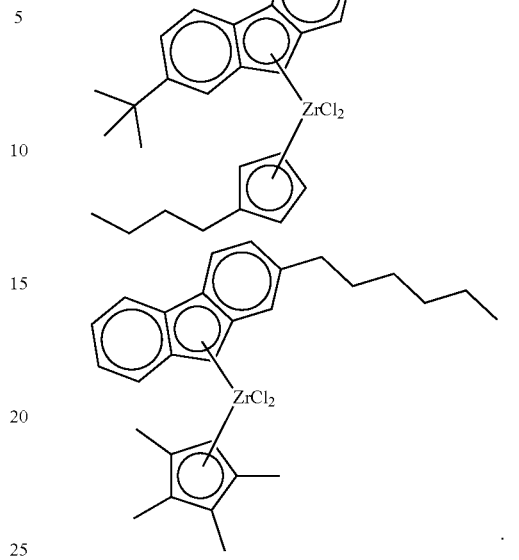

7. The polyethylene according to claim 3, wherein in the Chemical Formula 1, $Q_1$ and $Q_2$ are each independently hydrogen, a halogen, a C1 to C20 alkyl group, or a C2 to C20 alkoxyalkyl group; B is silicon; and $X_1$ and $X_2$ are each independently a halogen or a C1 to C20 alkyl group.

8. The polyethylene according to claim 3, wherein in the Chemical Formula 3, $Cp_1$ and $Cp_2$ are each independently cyclopentadienyl or indenyl, and at least one hydrogen of the cyclopentadienyl or indenyl is substituted with any one substituent of a C1 to 20 alkyl or a C2 to C20 alkoxyalkyl; $M_2$ is zirconium (Zr); and $X_3$ and $X_4$ are each independently a halogen or a C1 to C20 alkyl group.

9. A crosslinked polyethylene pipe produced by a crosslinking reaction of the polyethylene of claim 1, and a crosslinking agent.

10. The crosslinked polyethylene pipe according to claim 9, wherein the crosslinking agent comprises at least one of di-t-butyl peroxide (DTBP), dicumyl peroxide, di-t-amyl peroxide, or 2,5-dimethyl-2,5-di(t-butylperoxy)hexane.

11. The crosslinked polyethylene pipe according to claim 9, wherein a degree of crosslinking measured according to KS M ISO 10147 is 70% or more.

12. The crosslinked polyethylene pipe according to claim 9, which is a PE-Xa pipe.

13. The crosslinked polyethylene pipe according to claim 9, wherein the crosslinking agent is included in an amount of 0.4 to 1 part by weight based on 100 parts by weight of the polyethylene.

\* \* \* \* \*